US012577442B2

(12) United States Patent
Takahashi et al.

(10) Patent No.: US 12,577,442 B2
(45) Date of Patent: Mar. 17, 2026

(54) ADHESIVE COMPOSITION, RUBBER-ORGANIC FIBER CORD COMPOSITE, AND TIRE

(71) Applicant: BRIDGESTONE CORPORATION, Tokyo (JP)

(72) Inventors: Yuka Takahashi, Tokyo (JP); Masaaki Nakamura, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 249 days.

(21) Appl. No.: 18/255,871

(22) PCT Filed: Nov. 16, 2021

(86) PCT No.: PCT/JP2021/042103
§ 371 (c)(1),
(2) Date: Jun. 5, 2023

(87) PCT Pub. No.: WO2022/130879
PCT Pub. Date: Jun. 23, 2022

(65) Prior Publication Data
US 2023/0407147 A1 Dec. 21, 2023

(30) Foreign Application Priority Data
Dec. 15, 2020 (JP) ................................ 2020-207714

(51) Int. Cl.
*B60C 9/00* (2006.01)
*C09J 11/06* (2006.01)
*C09J 121/02* (2006.01)

(52) U.S. Cl.
CPC .......... *C09J 121/02* (2013.01); *B60C 9/0042* (2013.01); *C09J 11/06* (2013.01)

(58) Field of Classification Search
CPC ................................................ B60C 9/0042
See application file for complete search history.

(56) References Cited

U.S. PATENT DOCUMENTS 4,300,964 A 11/1981 Chaudhuri
5,543,455 A 8/1996 Shah
5,654,099 A 8/1997 Pelton
2002/0122938 A1* 9/2002 Fisher ........................ C08J 5/06 428/375
2012/0041113 A1 2/2012 Ikeda et al.
2013/0296493 A1 11/2013 Yamamoto et al.

FOREIGN PATENT DOCUMENTS

CA 1228438 A 10/1987
CN 102414362 A 4/2012
CN 104271624 A 1/2015
CN 105062374 A 11/2015
EP 2457933 A1 5/2012
JP S5667379 A 6/1981
JP S582370 A 1/1983
JP S58185643 A 10/1983
JP S6092371 A 5/1985
JP S6096674 A 5/1985
JP S6361433 A 3/1988
JP S63249784 A 10/1988
JP 2000052307 A 2/2000
JP 2010255153 A 11/2010
WO 9118739 A1 12/1991

OTHER PUBLICATIONS

Jan. 11, 2022, International Search Report issued in the International Patent Application No. PCT/JP2021/042103.
May 16, 2024, search result of the Extended European Search Report issued by the European Patent Office in the corresponding European Patent Application No. 21906243.7.
Jun. 13, 2023, International Preliminary Report on Patentability issued in the International Patent Application No. PCT/JP2021/042103.
May 29, 2025, search result of the Office Action issued by the China National Intellectual Property Administration in the corresponding Chinese Patent Application No. 202180084287.9.

* cited by examiner

*Primary Examiner* — Andrew T Piziali
(74) *Attorney, Agent, or Firm* — KENJA IP LAW PC

(57) ABSTRACT

Provided is an adhesive composition capable of achieving excellent adhesion and mechanical stability even when it contains no formalin or resorcin. The adhesive composition contains (A) rubber latex, and (B) a compound having an acrylamide structure.

17 Claims, No Drawings

ADHESIVE COMPOSITION, RUBBER-ORGANIC FIBER CORD COMPOSITE, AND TIRE

TECHNICAL FIELD

This disclosure relates to an adhesive composition, a rubber-organic fiber cord composite, and a tire.

BACKGROUND

Organic fibers such as polyester fibers have conventionally been extremely useful as a reinforcing material of a rubber article such as a tire, a belt, an air spring and a rubber hose in a form of, for example, a filament, a cord, a cable, a cord textile or a canvas, because they have high initial elastic modulus and excellent high-temperature dimensional stability. In this connection, various adhesive compositions have been proposed to improve the adhesion between such fibers and rubber. For example, there is a known technique of using a resorcin-formalin-latex (RFL) adhesive containing resorcin, formalin, rubber latex, etc. as an adhesive composition and thermally curing the RFL adhesive to ensure the adhesion (for example, see JP S58-002370 A (PTL 1), JP S60-092371 A (PTL 2), and JP S60-096674 A (PTL 3)).

Further, there are other known techniques of the adhesive compositions, such as techniques of using a resorcin-formalin resin obtained by initial condensation of resorcin and formalin (see JP S63-249784 A (PTL 4) and JP S63-061433 B (PTL 5)), and techniques of pretreating a tire cord made of polyester fibers or the like with an epoxy resin to improve the adhesion.

Formalin, which is commonly used in the adhesive compositions described above, is an important raw material for cross-linking resorcin, yet there has been a demand for reducing the use of formalin in consideration of the work environment in recent years. This also applies to resorcin, whose use has been demanded to reduce in terms of environmental protection.

In view of this, several environmentally friendly adhesive compositions and bonding methods using no resorcin or formalin have been proposed (for example, see JP 2010-255153 A (PTL 6)). However, adhesive compositions containing no resorcin or formalin are unsuited to practical use due to their poor productivity, because they cure slowly and tend to stick to drying and curing devices.

Further, when the adhesive composition contains rubber latex to improve the adhesion to a rubber member, the rubber latex particles tend to aggregate, and the dispersibility of the rubber latex (the mechanical stability of the adhesive composition) deteriorates when applied with a mechanical load. It is desired to solve this problem.

CITATION LIST

Patent Literature

PTL 1: JP S58-002370 A
PTL 2: JP S60-092371 A
PTL 3: JP S60-096674 A
PTL 4: JP S63-249784 A
PTL 5: JP S63-061433 B
PTL 6: JP 2010-255153 A

SUMMARY

Technical Problem

It could thus be helpful to provide an adhesive composition capable of achieving excellent adhesion and mechanical stability even when it contains no formalin or resorcin.

It is also helpful to provide a rubber-organic fiber cord composite and a tire which reduce the load on the environment and have excellent adhesion between the rubber and the organic fiber cord and excellent productivity.

Solution to Problem

According to our studies, we have found that, by containing a compound containing an acrylamide structure in an adhesive composition containing rubber latex, it is possible to achieve high adhesiveness, suppress aggregation of rubber latex particles, and improve mechanical stability, even when formalin and resorcin are not used.

The adhesive composition of the present disclosure contains (A) rubber latex and (B) a compound containing an acrylamide structure.

With this configuration, excellent adhesiveness and mechanical stability can be achieved even when formalin and resorcin are not contained.

The tire of the present disclosure uses the rubber-organic fiber cord composite of the present disclosure described above. With this configuration, it is possible to improve the adhesion between the rubber and the organic fiber cord while reducing the load on the environment.

Advantageous Effect

According to the present disclosure, it is possible to provide an adhesive composition capable of achieving excellent adhesion and mechanical stability even when it contains no formalin or resorcin.

Further, according to the present disclosure, it is possible to provide a rubber-organic fiber cord composite and a tire which reduce the load on the environment and have excellent adhesion between the rubber and the organic fiber cord and excellent productivity.

DETAILED DESCRIPTION

The following describes one embodiment of the adhesive composition for organic fiber cords, rubber-organic fiber cord composite, and tire of the present disclosure in detail.

<Adhesive Composition>

The adhesive composition for organic fiber cords of the present disclosure (hereinafter may be referred to as the "adhesive composition of the present disclosure") contains (A) rubber latex and (B) a compound containing an acrylamide structure (hereinafter may be referred to as the "acrylamide-containing compound").

By containing a compound containing an acrylamide structure in an adhesive composition containing rubber latex, it is possible to improve the adhesion between a rubber member and an organic fiber cord even when formalin and resorcin are not used. At the same time, the (B) acrylamide-containing compound suppresses aggregation of the rubber latex particles, and the (A) rubber latex is uniformly dispersed, which improves the mechanical stability of the adhesive composition.

Further, the adhesive composition for organic fiber cords of the present disclosure contains no resorcin or formalin, which reduces the load on the environment.

(Rubber Latex)

The adhesive composition for organic fiber cords of the present disclosure contains (A) rubber latex.

By coating an organic fiber cord with an adhesive composition containing rubber latex, the adhesion of the organic fiber cord to a rubber member can be improved.

The rubber latex is obtained by dispersing fine particles of a rubber component into a solvent such as water. The concentration of the rubber component in the latex may be in a range of 10% by mass to 60% by mass and preferably in a range of 20% by mass to 50% by mass.

The rubber component of the rubber latex is not particularly limited, and examples thereof include: natural rubber (NR); and synthetic rubber such as polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR), and vinylpyridine-styrene-butadiene copolymer rubber (Vp). These rubber components may be used alone or in combination of two or more.

Regarding the content of the rubber latex in the adhesive composition of the present disclosure, the content ratio of the (A) rubber latex is, in terms of solid content, preferably 70% to 99.7%, more preferably 80% to 99.5%, and even more preferably 85% to 99.5%, with the total content of the (A) rubber latex and the (β) compound having an acrylamide structure being 100%. When the rubber latex is contained in these ranges, better adhesiveness can be obtained.

(Acrylamide-Containing Compound)

The adhesive composition for organic fiber cords of the present disclosure contains (B) a compound containing an acrylamide structure (acrylamide-containing compound) in addition to the (A) rubber latex described above.

By using (B) an acrylamide-containing compound together with the (A) rubber latex in the adhesive composition, the acrylamide compound covers the surface of the rubber latex particles and suppresses aggregation of the rubber latex particles. As a result, the dispersibility of the rubber latex increases when applied with a mechanical load, and excellent mechanical stability can be achieved.

As used herein, the acrylamide-containing compound is a compound containing an acrylamide structure ($CH_2{=}CHCONH_2$) in the molecule.

The content of acrylamide in the acrylamide-containing compound is not particularly limited. It may be polyacrylamide, or a copolymer of acrylamide and acrylic acid or the like, or a compound partially having an acrylamide structure.

Further, anionic polyacrylamide, nonionic polyacrylamide, modified polyacrylamide, and the like can be used as the acrylamide-containing compound.

Commercially available products can also be used as the acrylamide-containing compound. Examples of commercially available products of the acrylamide-containing compounds include Haricoat G-38, Haricoat G-50, Haricoat G-51, Haricoat GA-1, Haricoat 1057, and Harmide C-10 (all manufactured by Harima Chemicals Group, Inc.), polyacrylamide (manufactured by Sigma-Aldrich), and WC-24 (manufactured by ARAKAWA CHEMICAL INDUSTRIES, LTD.).

The molecular weight of the acrylamide-containing compound is preferably 10,000 to 7,000,000, preferably 50,000 to 6,000,000, more preferably 50,000 to 3,000,000, further preferably 50,000 to 1,000,000, even more preferably 50,000 to 500,000, and particularly preferably 50,000 to 200,000.

When the molecular weight of the acrylamide-containing compound is 10,000 or more, aggregation of the rubber latex particles can be suppressed more reliably. When the molecular weight of the acrylamide-containing compound is 7,000,000 or less, problems such as cross-linking and gelation of the acrylamide-containing compound do not occur. As a result, the mechanical stability of the adhesive composition can be further improved.

The content of the acrylamide-containing compound in the adhesive composition for organic fiber cords of the present disclosure is not particularly limited. For example, from the viewpoint of achieving better adhesion and mechanical stability, the content ratio of the (β) compound having an acrylamide structure is, in terms of solid content, preferably 0.3% to 20%, preferably 0.5% to 20%, and more preferably 0.5% to 15%, with the total content of the (A) rubber latex and the (β) compound having an acrylamide structure being 100%.

When the content ratio of the (β) compound having an acrylamide structure is, in terms of solid content, 0.3% or more with the total content of the (A) rubber latex and the (β) compound having an acrylamide structure being 100%, aggregation of the rubber latex particles can be reliably suppressed, and the mechanical stability can be further improved. When the ratio is 20% or less, the adhesiveness of the rubber latex to rubber will not be deteriorated.

Regarding the total content of the (A) rubber latex and the (B) compound having an acrylamide structure in the adhesive composition for organic fiber cords of the present disclosure, the total content of the (A) rubber latex and the (β) compound having an acrylamide structure is, in terms of solid content, preferably 20% to 95% and more preferably 25% to 95%, with the total content of the (A) rubber latex, the (β) compound having an acrylamide structure, and at least one selected from the group consisting of (D) an epoxy compound and (C) an aqueous compound having a (thermal dissociative blocked) isocyanate group being 100%.

When the total content of the (A) rubber latex and the (β) compound having an acrylamide structure is within the above ranges, both the adhesion of the rubber latex to rubber and the mechanical stability can be achieved at a higher level.

In addition to the (A) rubber latex and the (B) acrylamide-containing compound described above, the adhesive composition for organic fiber cords of the present disclosure preferably further contains at least one selected from the group consisting of (D) epoxy compound and the (C) aqueous compound having a (thermal dissociative blocked) isocyanate group (hereinafter may be collectively referred to as the “component (D)”). By further containing these components, better adhesiveness can be obtained.

The content of the component (D) in the adhesive composition for organic fiber cords of the present disclosure is not particularly limited.

For example, from the viewpoint of achieving better adhesiveness without adversely affecting other physical properties, the content of the component (D) is, in terms of solid content, preferably 5% to 80%, more preferably 5% to 75%, and even more preferably 10% to 70%, with the total content of the (A) rubber latex, the (β) compound having an acrylamide structure, and at least one selected from the group consisting of (D) epoxy compound and the (C) aqueous compound having a (thermal dissociative blocked) isocyanate group being 100%.

(Epoxy Compound)

Various types of compounds having at least one epoxy group in one molecule can be used as the (D) epoxy compound. The epoxy compound functions as a cross-linking agent in the adhesive composition and can achieve excellent adhesiveness and improve properties such as heat resistance, durability, strength, flexibility, and electric insulation properties.

Although the epoxy compound is not particularly limited, it is preferably a compound having two or more epoxy groups in one molecule and more preferably a compound having four or more epoxy groups in one molecule. An epoxy compound having two or more epoxy groups in one molecule can effectively function as a cross-linking agent because of the epoxy groups, and an epoxy compound having four or more epoxy groups in one molecule can perform cross-linking more densely and achieve better flexibility.

Although the epoxy compound is not particularly limited, it preferably has 10 or less epoxy groups in one molecule. The cross-linking density will not be too high and satisfactory toughness can be obtained in this case.

Specific examples of the epoxy compound include a product obtained by a reaction between a polyhydric alcohol and epichlorohydrin, such as diethylene glycol diglycidyl ether, polyethylene diglycidyl ether, polypropylene glycol diglycidyl ether, neopentyl glycol diglycidyl ether, 1,6-hexanediol diglycidyl ether, glycerol polyglycidyl ether, trimethylolpropane polyglycidyl ether, polyglycerol polyglycidyl ether, pentaerythrithol polyglycidyl ether, diglycerol polyglycidyl ether, and sorbitol polyglycidyl ether. It is possible to further improve the adhesion between an organic fiber cord and rubber by using any of these compounds as the epoxy compound.

Regarding the content of the epoxy compound, the content of the (D) epoxy compound is, in terms of solid content, preferably 0.5% to 80%, more preferably 10% to 77%, and even more preferably 20% to 75%, with the total content of at least one selected from the group consisting of (D) epoxy compound and the (C) aqueous compound having a (thermal dissociative blocked) isocyanate group being 100%. When the content is within these ranges, the epoxy compound exhibits outstanding effects.

(Polyphenol Compound)

The polyphenol compound functions as a cross-linking agent and/or an adhesion promoter, thereby further improving the adhesiveness of the adhesive composition.

Although the type of the polyphenol compound is not particularly limited, it preferably has three or more hydroxyl groups from the viewpoint of reducing the load on the environment while obtaining excellent adhesiveness. Such a polyphenol compound can use at least one selected from the group consisting of phloroglucinol (the formula (1) below), morin (the formula (2) below), phloroglucide (the formula (3) below), lignin, and tannin. It is more preferable that the polyphenol compound should contain at least lignin among the above.

[Chem. 1]

(1)

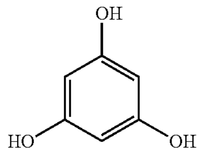

-continued (2)

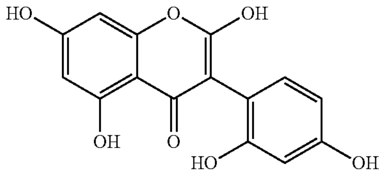

(3)

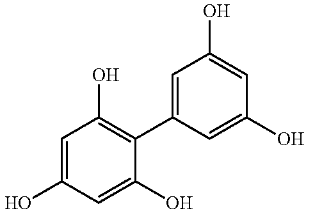

The lignin and tannin are derived from plants, yet the plants from which they are derived are not particularly limited. The lignin and tannin may be natural products as they are, or may be those that have been subjected to various chemical treatments.

Examples of the lignin include dealkalized lignin, alkaline lignin, and sodium sulfonate lignin. Examples of the tannin include mimosa-derived plant tannin and quebracho-derived plant tannin.

The polyphenol compound may be used alone or in combination of two or more.

Further, it is preferable to appropriately adjust the content of the polyphenol compound in the adhesive composition in consideration of the case of using it as a cross-linking agent or the case of using it as an adhesion promoter.

Regarding the content of the polyphenol compound, the content of the polyphenol compound is, in terms of solid content, preferably 0.5% to 75%, more preferably 0.5% to 60%, and even more preferably 1% to 50%, with the total content of at least one selected from the group consisting of (D) epoxy compound, the polyphenol compound, and the (C) aqueous compound having a (thermal dissociative blocked) isocyanate group being 100%.

<Aqueous Compound Having a (Thermal Dissociative Blocked) Isocyanate Group>

The (C) aqueous compound having a (thermal dissociative blocked) isocyanate group is a compound that promotes adhesion of the adhesive composition to a resin material as an adherend and that has an isocyanate group as a polar functional group.

The "(thermal dissociative blocked) isocyanate group" of the "aqueous compound having a (thermal dissociative blocked) isocyanate group" means a thermal dissociative blocked isocyanate group or an isocyanate group, including (i) a thermal dissociative blocked isocyanate group formed by the reaction of an isocyanate group with a thermal dissociative blocking agent for the isocyanate group, (ii) an isocyanate group where the isocyanate group has not reacted with a thermal dissociative blocking agent for the isocyanate group, (iii) an isocyanate group formed by dissociation of a thermal dissociative blocking agent from a thermal dissociative blocked isocyanate group, and (iv) an isocyanate group.

The "aqueous" of the aqueous compound having a (thermal dissociative blocked) isocyanate group indicates that it is water-soluble or water-dispersible. The "water-soluble"

does not necessarily mean completely water-soluble. The "water-soluble" means that it is partially water-soluble or means that phase separation will not occur in an aqueous solution of the adhesive composition of the present disclosure.

The thermal dissociative blocking agent is not particularly limited if it is a blocking agent compound that protects the isocyanate group from any chemical reaction where the blocking agent can be dissociated by heat treatment as necessary to restore the isocyanate group. Specifically, it is preferably a thermal dissociation temperature at which the cross-linking reactivity of the isocyanate group, which is blocked by the thermal dissociative blocking agent and suppressed, can be recovered at the temperature of heat treatment for heat curing after coating and drying the adhesive liquid.

Examples of the blocking agent include alcohol, phenol, active methylene, oxime, lactam, and amine. Specific examples thereof include, but are not limited to, lactams such as ε-caprolactam, 8-valerolactam, and γ-butyrolactam; phenols such as phenol, cresol, ethylphenol, butylphenol, octylphenol, nonylphenol, dinonylphenol, thiophenol, chlorophenol, and amylphenol; oximes such as methylethylketoxime, acetone oxime, acetophenone oxime, benzophenone oxime, and cyclohexanone oxime; alcohols such as methanol, ethanol, butanol, isopropyl alcohol, butyl alcohol, and cyclohexanol; malonic acid dialkyl esters such as dimethyl malonate and diethyl malonate; active methylenes such as methyl acetoacetate, ethyl acetoacetate, and acetylacetone, mercaptans such as butyl mercaptan and dodecyl mercaptan; amides such as acetanilide and acetic acid amide; imides such as succinimide, phthalic acid imide, and maleic acid imide; sulfites such as sodium bisulfite; cellosolves such as methyl cellosolve, ethyl cellosolve and butyl cellosolve; pyrazoles such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; amines such as dimethylamine, diethylamine, di-n-propylamine, diisopropylamine, dicyclohexylamine, diphenylamine, xylidine, N,N-diethylhydroxyamine, N,N'-diphenylformamidine, 2-hydroxypyridine, 3-hydroxypyridine, and 2-mercaptopyridine; and triazoles such as 1,2,4-triazole. A mixture of two or more of these may be used.

The blocking agent is preferably phenol, ε-caprolactam and ketoxime, which facilitates stable heat curing of the adhesive composition by thermal dissociation by heating.

Specifically, the aqueous compound having a (thermal dissociative blocked) isocyanate group includes aromatic polyisocyanates or aromatic aliphatic polyisocyanates. Examples of the aromatic isocyanates include phenylene diisocyanates such as m-phenylene diisocyanate and p-phenylene diisocyanate; tolylene diisocyanates such as 2,4-tolylene diisocyanate and 2,6-tolylene diisocyanate (TDI); diphenylmethane diisocyanates such as 2,4'-diphenylmethane diisocyanate, 4,4'-diphenylmethane diisocyanate (MDI), dialkyldiphenylmethane diisocyanate, and tetraalkyldiphenylmethane diisocyanate; polymethylene polyphenyl polyisocyanate (polymeric MDI); m- or p-isocyanatophenylsulfonyl isocyanates; diisocyanatobiphenyls such as 4,4'-diisocyanatobiphenyl and 3,3'-dimethyl-4,4'-diisocyanatobiphenyl; and naphthalene diisocyanates such as 1,5-naphthylene diisocyanate. Examples of the aromatic aliphatic polyisocyanates include xylylene diisocyanates such as m-xylylene diisocyanate, p-xylylene diisocyanate (XDI), and tetramethylxylylene diisocyanate; diethylbenzene diisocyanate; and α,α,α,α-tetramethylxylylene diisocyanate (TMXDI). Modified products such as carbodiimide, polyol and allophanate of the polyisocyanates are also included.

Among these polyisocyanates containing an aromatic ring in the molecule, aromatic isocyanate is preferable, tolylene diisocyanate (TDI), diphenylmethane diisocyanate (MDI) or polymethylene polyphenyl polyisocyanate (polymeric MDI) are more preferable, and diphenylmethane diisocyanate (MDI) is particularly preferable, from the viewpoint of the cord focusing properties of the adhesive composition.

Although the aqueous compound having a (thermal dissociative blocked) isocyanate group is not particularly limited, it is more preferably an aqueous urethane compound having a (thermal dissociative blocked) isocyanate group.

The details of the aqueous urethane compound having a (thermal dissociative blocked) isocyanate group will be described later.

Regarding the Functional Effect of (a) as an Adhesion Promoter

Regarding the content of the (C) aqueous compound having a (thermal dissociative blocked) isocyanate group, the content of the (C) aqueous compound having a (thermal dissociative blocked) isocyanate group is, in terms of solid content, preferably 0.5% to 80%, more preferably 1% to 75%, and even more preferably 5% to 70%, with the total content of at least one selected from the group consisting of (D) epoxy compound and the (C) aqueous compound having a (thermal dissociative blocked) isocyanate group being 100%. The reason is as follows. When the content ratio of the (C) aqueous compound having a (thermal dissociative blocked) isocyanate group is 0.5% or more, the adhesion between a resin and a coated rubber composition is improved. Further, when the ratio is 75% or less, it is possible to secure a certain amount or more of other components such as rubber latex to be blended in the adhesive composition, thereby further improving the adhesion to rubber as an adherend.

A polyester synthetic resin material such as polyethylene terephthalate, which is widely used as an organic fiber cord, contains a flat linear polymer chain. The surface of the polymer chain or the gap of the polymer chain has a π-electron atmosphere derived from the aromatics and the like contained in the polymer chain. Further, polyester has a particularly small number of hydroxyl groups on the surface as compared with 6,6-nylon. Therefore, conventionally, an adhesive composition for organic fiber cords used for an organic fiber cord made of polyester has contained molecules having a planar structure having an aromatic ring with aromatic π electrons on the side surface ("a part that easily diffuses into the organic fiber cord") as an adhesion promoter for the purposes that

- the adhesive composition for organic fiber cords is dispersed into the gap of the polymer chain of the organic fiber cord, and
- an adhesive layer of the adhesive composition for organic fiber cords adheres to the surface of the polymer chain of the organic fiber cord to obtain sufficient adhesiveness.

The "water-dispersible (thermal dissociative blocked) isocyanate compound that is an addition product of polyisocyanate having an aromatic ring and a blocking agent having at least one active hydrogen group" has been a specific example of such an adhesion promoter.

It is more preferable that the rubber-resin adhesive composition of the present disclosure should contain "an aqueous urethane compound having a (thermal dissociative blocked) isocyanate group" having a hydrophilic molecular chain part that is "a part that is difficult to diffuse into a resin" in addition to a hydrophobic aromatic polyisocyanate part that is "a part that easily diffuses into a resin" in the molecular structure.

The "aqueous" of the "aqueous urethane compound" indicates that it is water-soluble or water-dispersible. The "water-soluble" does not necessarily mean completely water-soluble. The "water-soluble" means that it is partially water-soluble or means that phase separation will not occur in an aqueous solution of the adhesive composition.

The "urethane compound" of the "aqueous urethane compound" is a compound having a covalent bond formed between nitrogen of an amine and carbon of a carbonyl group, and it refers to a compound represented by the following general formula,

[Chem. 2]

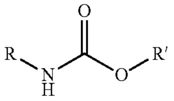

where R and R' represent a hydrocarbon group.

The molecular weight of the "aqueous urethane compound having a (thermal dissociative blocked) isocyanate group" is not particularly limited if the compound is water-based. However, the number average molecular weight is preferably 1,500 to 100,000. The number average molecular weight is particularly preferably 9,000 or less.

As described above, a method of synthesizing the "aqueous urethane compound having a (thermal dissociative blocked) isocyanate group" is not particularly limited, and a known method such as the method described in JP S63-051474 A may be used.

A preferred embodiment of the "aqueous urethane compound having a (thermal dissociative blocked) isocyanate group" is a reaction product obtained by mixing (α), (β), (γ) and (δ) and reacting them, where

- (α) is an organic polyisocyanate compound having 3 or more and 5 or less functional groups and having a number average molecular weight of 2,000 or less,
- (β) is a compound having 2 or more and 4 or less active hydrogen groups and a number average molecular weight of 5,000 or less,
- (γ) is a thermal dissociative blocking agent, and
- (δ) is a compound having at least one active hydrogen group and at least one anionic, cationic, or nonionic hydrophilic group, and (α), (β), (γ) and (δ) are mixed so that
- the mixing ratio of (α) is 40% by mass or more and 85% by mass or less,
- the mixing ratio of (β) is 5% by mass or more and 35% by mass or less,
- the mixing ratio of (γ) is 5% by mass or more and 35% by mass or less, and
- the mixing ratio of (δ) is 5% by mass or more and 35% by mass or less with respect to the total amount of (α), (β), (γ) and (δ), and
- when the molecular weight of the isocyanate group (—NCO) is 42, the composition ratio of the (thermal dissociative blocked) isocyanate group in the reaction product is 0.5% by mass or more and 11% by mass or less.

In this case, the "aqueous urethane compound having a (thermal dissociative blocked) isocyanate group" has both a (thermal dissociative blocked) isocyanate group moiety and a hydrophilic moiety having a hydrophilic group, so that the self-water solubility of the urethane compound is increased.

The (α) organic polyisocyanate compound having 3 or more and 5 or less functional groups and having a number average molecular weight of 2,000 or less is not particularly limited. However, it is preferably an aromatic polyisocyanate compound and an oligomer thereof, and it may be other aliphatic, alicyclic, or heterocyclic polyisocyanate compound and an oligomer thereof. This is because the "aqueous urethane compound having a (thermal dissociative blocked) isocyanate group" obtained as a reaction product after reacting the (α) organic polyisocyanate compound having 3 or more and 5 or less functional groups and having a number average molecular weight of 2,000 or less as described above is easier to disperse into the gap of the polymer chain of a resin.

Specific examples thereof include ethylene diisocyanate, 1,4-tetramethylene diisocyanate, 1,6-hexamethylene diisocyanate, 1,12-dodecane diisocyanate, 2,2,4-trimethylhexamethylene diisocyanate, 2,4,4-trimethylhexamethylene diisocyanate, dimer acid diisocyanate, and lysine diisocyanate as an aliphatic polyisocyanate compound; cyclobutane-1,3-diisocyanate, cyclohexane-1,3-diisocyanate, cyclohexane-1,4-diisocyanate, isophorone diisocyanate, 4,4'-methylenebis (cyclohexylisocyanate), methylcyclohexane-2,4-diisocyanate, methylcyclohexane-2,6-diisocyanate, and 1,3-(isocyanatomethyl)cyclohexane as an alicyclic polyisocyanate compound; tolylene diisocyanate adduct of 1,3,5-tris(2'-hydroxyethyl) isocyanuric acid as a heterocyclic polyisocyanate compound; and as an aromatic polyisocyanate compound, m-phenylene diisocyanate, p-phenylene diisocyanate, 2,4-tolylene diisocyanate, 2,6-tolylene diisocyanate, m-xylylene diisocyanate, p-xylylene diisocyanate, 2,4'-diphenylmethane diisocyanate, 4,4'-diphenylmethane diisocyanate, m-tetramethylxylylene diisocyanate, p-tetramethylxylylene diisocyanate, methinetris(4-phenylisocyanate), tris(4-isocyanatophenyl) methane, tris thiophosphate (4-isocyanatophenyl ester), 3-isopropenyl-α',α'-dimethylbenzyl isocyanate and oligomer mixtures thereof, and modified products such as carbodiimides, polyols and allophanates of these polyisocyanate compounds.

Among the above, an aromatic polyisocyanate compound is preferable, and methylenediphenyl polyisocyanate, polyphenylene polymethylene polyisocyanate and the like are particularly preferable. Polyphenylene polymethylene polyisocyanate having a number average molecular weight of 2,000 or less is preferable, and polyphenylene polymethylene polyisocyanate having a number average molecular weight of 1,000 or less is particularly preferable. This is because the "aqueous urethane compound having a (thermal dissociative blocked) isocyanate group" obtained as a reaction product after reacting the (α) organic polyisocyanate compound having 3 or more and 5 or less functional groups and having a number average molecular weight of 2,000 or less as described above is easier to disperse into the gap of the polymer chain of a resin.

The (β) compound having 2 or more and 4 or less active hydrogen groups and a number average molecular weight of 5,000 or less is not particularly limited. Specific examples thereof include compounds selected from the group consisting of the following (i) to (vii),

- (i) polyhydric alcohols having 2 or more and 4 or less hydroxyl groups and having a number average molecular weight of 5,000 or less, (ii) multivalent amines having 2 or more and 4 or less primary and/or secondary amino groups and having a number average molecular weight of 5,000 or less, (iii) amino alcohols having 2 or more and 4 or less primary and/or secondary amino groups and hydroxyl groups and having a number average molecular weight of 5,000 or less, (iv) polyester polyols having 2 or more and 4 or less hydroxyl groups and having a number average molecular weight of 5,000 or less, (v) polybutadiene polyols having 2 or more and 4 or less hydroxyl groups and having a number average molecular weight of 5,000 or less, and copolymers thereof with other vinyl monomers, (vi) polychloroprene polyols having 2 or more and 4 or less hydroxyl groups and having a number average molecular weight of 5,000 or less, and copolymers thereof with other vinyl monomers, and (vii) polyether polyols having 2 or more and 4 or less hydroxyl groups and having a number average molecular weight of 5,000 or less, which is multivalent amine, C2-C4 alkylene oxide heavy adduct of polyhydric phenol and amino alcohols, C2-C4 alkylene oxide heavy adduct of C3 or higher polyhydric alcohols, C2-C4 alkylene oxide copolymer, or C3-C4 alkylene oxide polymer.

For the "aqueous urethane compound having a (thermal dissociative blocked) isocyanate group", the "active hydrogen group" refers to a group containing hydrogen that becomes active hydrogen (atomic hydrogen (hydrogen radical) and hydride ion (hydride)) when placed under suitable conditions. Examples of the active hydrogen group include an amino group and a hydroxyl group.

The compound having at least one active hydrogen group and at least one anionic hydrophilic group of the "(δ) compound having at least one active hydrogen group and at least one anionic, cationic, or nonionic hydrophilic group" is not particularly limited. Examples thereof include aminosulfonic acids such as taurine, N-methyltaurine, N-butyltaurine and sulfanilic acid, and aminocarboxylic acids such as glycine and alanine.

A method of synthesizing the "aqueous urethane compound having a (thermal dissociative blocked) isocyanate group" by mixing and reacting the above-described (α), (β), (γ) and (δ) is not particularly limited, and a known method such as the method described in JP S63-051474 A may be used.

Yet another preferred embodiment of the "aqueous urethane compound having a (thermal dissociative blocked) isocyanate group" is represented by the following general formula (1),

[Chem. 3]

(1)

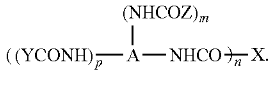

[where

A is a residue of an organic polyisocyanate compound from which an active hydrogen group has been eliminated, X is a residue of a polyol compound having 2 or more and 4 or less hydroxyl groups and having a number average molecular weight of 5,000 or less from which an active hydrogen group has been eliminated, Y is a residue of a thermal dissociative blocking agent from which an active hydrogen group has been eliminated, Z is a residue of a compound having at least one active hydrogen group, and at least one salt-forming group or hydrophilic polyether chain, from which an active hydrogen group has been eliminated, n is an integer of 2 or more and 4 or less, and p+m is an integer of 2 or more and 4 or less (m≥0.25)].

In this case, the "aqueous urethane compound having a (thermal dissociative blocked) isocyanate group" has both a (thermal dissociative blocked) isocyanate group moiety and a hydrophilic moiety having a hydrophilic group, so that the self-water solubility of the urethane compound is increased.

In the formula (1), the "organic polyisocyanate compound" of the A "residue of an organic polyisocyanate compound from which an active hydrogen group has been eliminated" preferably contains an aromatic ring. In this case, the "aqueous urethane compound having a (thermal dissociative blocked) isocyanate group" is easier to disperse into the gap of the polymer chain of a resin.

Examples thereof include, but are not limited to, methylenediphenyl polyisocyanate and polyphenylene polymethylene polyisocyanate. Polyphenylene polymethylene polyisocyanate having a number average molecular weight of 6,000 or less is preferable, and polyphenylene polymethylene polyisocyanate having a number average molecular weight of 4,000 or less is particularly preferable.

In the formula (1), the "polyol compound having 2 or more and 4 or less hydroxyl groups and having a number average molecular weight of 5,000 or less" of the X "residue a polyol compound having 2 or more and 4 or less hydroxyl groups and having a number average molecular weight of 5,000 or less from which an active hydrogen group has been eliminated" is not particularly limited. Specific examples thereof include compounds selected from the group consisting of the following (i) to (vi), (i) polyhydric alcohols having 2 or more and 4 or less hydroxyl groups and having a number average molecular weight of 5,000 or less, (ii) amino alcohols having 2 or more and 4 or less primary and/or secondary amino groups and hydroxyl groups and having a number average molecular weight of 5,000 or less, (iii) polyester polyols having 2 or more and 4 or less hydroxyl groups and having a number average molecular weight of 5,000 or less, (iv) polybutadiene polyols having 2 or more and 4 or less hydroxyl groups and having a number average molecular weight of 5,000 or less, and copolymers thereof with other vinyl monomers, (v) polychloroprene polyols having 2 or more and 4 or less hydroxyl groups and having a number average molecular weight of 5,000 or less, and copolymers thereof with other vinyl monomers, and (vi) polyether polyols having 2 or more and 4 or less hydroxyl groups and having a number average molecular weight of 5,000 or less, which is multivalent amine, C2-C4 alkylene oxide heavy adduct of polyhydric phenol and amino alcohols, C2-C4 alkylene oxide heavy adduct of C3 or higher polyhydric alcohols, C2-C4 alkylene oxide copolymer, or C3-C4 alkylene oxide polymer.

The “aqueous urethane compound having a (thermal dissociative blocked) isocyanate group” is not particularly limited, and commercially available products such as ELASTRON BN27, BN77, and BN11 manufactured by DKS Co. Ltd. can be used. The BN77 was suitably used in the following examples of the present disclosure.

A method of producing the adhesive composition for organic fiber cords of the present disclosure is not particularly limited, and the adhesive composition can be produced, for example, by mixing each material and aging the mixture.

The adhesive composition is usually used in the form of an aqueous solution, and the solid content in the aqueous solution of the adhesive composition is preferably in a range of 5% by mass to 60% by mass and more preferably in a range of 5% by mass to 50% by mass.

In the method of producing the adhesive composition of the present disclosure, the adhesive composition may be composed of a one-bath treatment solution or may be composed of a two-bath treatment solution. As used herein, the one-bath treatment is a treatment of dipping an organic fiber cord as an adherend in one treatment solution (adhesive composition) to apply the adhesive composition to the surface of the organic fiber cord, and the two-bath treatment is a treatment of dipping an organic fiber cord as an adherend in two treatment solutions in sequence to apply the adhesive composition to the surface of the organic fiber cord. Therefore, when the adhesive composition is a two-bath treatment solution, the adhesive composition is a combination of a first-bath treatment solution and a second-bath treatment solution.

<Rubber-Organic Fiber Cord Composite>

The rubber-organic fiber cord composite of the present disclosure is a rubber-organic fiber cord composite including a rubber member and an organic fiber cord, where at least part of the organic fiber cord is coated with the above-described adhesive composition for organic fiber cords of the present disclosure.

Because the rubber-organic fiber cord composite of the present disclosure uses the adhesive composition for organic fiber cords of the present disclosure, it reduces the load on the environment and has excellent adhesion between the rubber and the organic fiber cord and good productivity.

Applications of the rubber-organic fiber cord composite of the present disclosure are not particularly limited. For example, it can be used as a member such as a belt, an air spring, or a hose.

In the rubber-organic fiber cord composite of the present disclosure, the adhesive composition of the present disclosure may be coated on at least part of the organic fiber cord. However, from the viewpoint of further improving the adhesion between the rubber and the organic fiber cord, it is preferable that the adhesive composition of the present disclosure should be coated all over the organic fiber cord.

A method of coating the adhesive composition on at least part of the organic fiber cord is not particularly limited, and examples thereof include dipping, coating, and spraying. When the adhesive composition contains a solvent, the solvent can be removed by a drying treatment after coating.

The material of the organic fiber cord is not particularly limited and can be appropriately selected depending on the application. Examples of the organic fiber cord include a fiber cord made of polyester such as polyethylene terephthalate (PET), a fiber cord made of aliphatic polyamide such as 6-nylon, 6,6-nylon and 4,6-nylon, a fiber cord made of polyketone, a fiber cord made of aromatic polyamide such as praraphenylene terephthalamide, and a cellulose-based fiber cord such as rayon. The adhesive composition of the present disclosure can improve the adhesion between a rubber member and a cord even when it is coated on a polyester fiber cord which generally has low adhesion to rubber.

Various rubber compositions (raw materials) containing at least a rubber component can be used as the rubber member of the rubber-organic fiber cord composite of the present disclosure, and the rubber member is preferably formed of a vulcanized rubber obtained by vulcanizing the rubber composition. The rubber composition can be produced, for example, by blending a rubber component of natural rubber or synthetic rubber (such as butadiene rubber, styrene-butadiene rubber, and isoprene rubber) with a filler such as carbon black and silica, a cross-linking agent such as sulfur and peroxides, a cross-linking accelerator, and the like by kneading, heating, extruding, or other methods.

The rubber-organic fiber cord composite of the present disclosure can be produced, for example, by coating at least part of the organic fiber cord with the adhesive composition, then covering the organic fiber cord which has been coated with the adhesive composition with an unvulcanized rubber composition as a raw material of the rubber member to prepare an unvulcanized rubber-organic fiber cord composite, and then performing vulcanization.

<Tire>

The tire of the present disclosure uses the rubber-organic fiber cord composite of the present disclosure.

In the tire of the present disclosure, the rubber-organic fiber cord composite of the present disclosure can be used, for example, as a carcass ply, a belt layer, a belt reinforcing layer, or a belt-surrounding reinforcing layer such as a flipper.

In accordance with the type of tire, the tire of the present disclosure may be obtained by first shaping a tire using an unvulcanized rubber composition and then vulcanizing the tire, or by first shaping a tire using semi-vulcanized rubber yielded by a preliminary vulcanization process and then fully vulcanizing the tire. For the tire of the present disclosure, an organic fiber cord that has been treated with the above-described adhesive composition can be used in any part of the tire, and other members are not particularly limited and may be known members.

The tire of the present disclosure is preferably a pneumatic tire. The pneumatic tire may be filled with ordinary air or air with an adjusted partial pressure of oxygen, or may also be filled with an inert gas such as nitrogen, argon, or helium.

EXAMPLES

The following describes the present disclosure in more detail with reference to examples, but the present disclosure is not limited to the following examples.

The (A) rubber latex, the (β) compound having an acrylamide structure, the (D) epoxy compound and the (C) aqueous compound having a (thermal dissociative blocked) isocyanate group used in Examples 1 and 2 are listed in Table 1 below.

TABLE 1

| Component of adhesive composition | | Ingredient/concentration (purity) | Product name/ Company |
|---|---|---|---|
| (A) Rubber latex | A-1 | Vinylpyridine-styrene-butadiene copolymer latex<br>Solid content concentration: 41% | PYRATEX<br>NIPPON A&L INC. |
| (B) Compound having an acrylamide structure | B-1 | Polyacrylamide (Nonionic water-soluble polymer)<br>Solid content concentration: 20% | polyacrylamide<br>Sigma-Aldrich |
| | B-2 | Nonionic polyacrylamide<br>Solid content concentration: 20% | Haricoat 1057<br>Harima Chemicals Group, Inc. |
| | B-3 | Anionic polyacrylamide<br>Solid content concentration: 10% | Harmide C-10<br>Harima Chemicals Group, Inc. |
| | B-4 | Nonionic polyacrylamide<br>Solid content concentration: 20% | WC-24<br>ARAKAWA CHEMICAL INDUSTRIES, LTD. |
| (D) Epoxy compound | D-1 | Sorbitol polyglycidyl ether<br>Solid content concentration: >99% | DENACOL EX-614B<br>Nagase ChemteX Corporation |
| | D-2 | Two-component aqueous epoxy resin<br>Solid content concentration: 40% to 50% | EPICON EM-N01-50W<br>DIC Corporation |
| Polyphenol compound | 2-1 | Sodium lignosulfonate<br>Solid content concentration: >98% | Sodium Ligninsulfonate<br>Tokyo Chemical Industry Co., Ltd. |
| | 2-2 | Lignin (alkaline)<br>Solid content concentration: >98% | Lignin (Alkaline)<br>Tokyo Chemical Industry Co., Ltd. |
| (C) Aqueous compound having a | C-1-1 | Aqueous urethane compound having a thermal dissociative blocked aromatic isocyanate group<br>Solid content concentration: 100% | Grilbond IL-6<br>EMS-GRILTECH |
| (thermal dissociative blocked) | C-1-2 | Aqueous urethane compound having a thermal dissociative blocked aromatic isocyanate group<br>Solid content concentration: 42% | DM6400<br>Meisei Chemical Works, Ltd. |
| isocyanate group | C-2-1 | Aqueous urethane compound having a thermal dissociative blocked aromatic isocyanate group<br>Solid content concentration: 43% to 44% | MEIKANATE TP-10<br>Meisei Chemical Works, Ltd. |
| | C-2-2 | Aqueous urethane compound having a thermal dissociative blocked aliphatic isocyanate group<br>Solid content concentration: 40% | NK ASSIST NY-50<br>NICCA CHEMICAL CO., LTD. |
| | C-2-3 | Aqueous urethane compound having a thermal dissociative blocked aromatic isocyanate group<br>Solid content concentration: 31% | ELASTRON BN77<br>DKS Co. Ltd. |
| | C-2-4 | Aqueous urethane compound having a thermal dissociative blocked aromatic isocyanate group<br>Solid content concentration: 31% | ELASTRON BN77<br>DKS Co. Ltd. |
| | C-2-5 | Self-emulsifying high-molecular weight aqueous urethane resin (isocyanate-ester type)<br>Solid content concentration: 35% | SUPPER FLEX 210<br>DKS Co. Ltd. |

Example 1

Samples 1-1 to 1-10 of adhesive composition (aqueous solution containing polyacrylamide and rubber latex at predetermined solid contents) having the composition listed in Table 1 were prepared. The mechanical stability of the adhesive composition was evaluated with the following method.

(1) Evaluation of Mechanical Stability

The adhesive composition of each sample was subjected to a Maron mechanical stability test in accordance with JIS-K6387 under the following conditions, and the amount of rubber latex aggregate formed in the adhesive composition (gelation rate) was measured. The measurement results are listed in Table 2.

Conditions

Adhesive composition of each sample: 100 g

Load: 30 kgf

Rotor speed: 1000 rpm

Time: 10 minutes

TABLE 2

| Sample | | 1-1 Comparative Example | 1-2 Example | 1-3 Example | 1-4 Example | 1-5 Example | 1-6 Example | 1-7 Example | 1-8 Example | 1-9 Example | 1-10 Example |
|---|---|---|---|---|---|---|---|---|---|---|---|
| (A) Rubber latex | Ingredient | A-1 | A-1 | A-1 | A-1 | A-1 | A-1 | A-1 | A-1 | A-1 | A-1 |
| | Part by mass (dry) | 100 | 97.0 | 99.5 | 99.0 | 98.5 | 97.7 | 97.0 | 95.0 | 95.0 | 97.7 |
| (B) Compound having an acrylamide structure | Ingredient | — | B-1 | B-2 | B-2 | B-2 | B-2 | B-2 | B-2 | B-3 | B-4 |
| | Part by mass (dry) | — | 3.0 | 0.5 | 1.0 | 1.5 | 2.3 | 3.0 | 5.0 | 5.0 | 3.0 |
| Solid content of test adhesive liquid | (%) | 18 | 18 | 18 | 18 | 18 | 18 | 18 | 18 | 18 | 18 |

TABLE 2-continued

| Sample | | 1-1 Comparative Example | 1-2 Example | 1-3 Example | 1-4 Example | 1-5 Example | 1-6 Example | 1-7 Example | 1-8 Example | 1-9 Example | 1-10 Example |
|---|---|---|---|---|---|---|---|---|---|---|---|
| Mechanical stability evaluation | Solidification rate (%) | 9.1 | 1.4 | 3.8 | 3.1 | 3.4 | 2.1 | 1.0 | 1.0 | 6.4 | 5.5 |

From the results listed in Table 2, it can be seen that the samples of Examples have a lower gelation rate than the sample of Comparative Example, and in the samples of Examples, aggregation of rubber latex particles is suppressed, and the mechanical stability is excellent.

Example 2

Samples 2-1 to 2-10 of adhesive composition (aqueous solution containing each component in a predetermined solid content) having the composition listed in Table 3 were prepared under the following conditions. A typical preparation method is as follows.

The (A) rubber latex and the (β) compound having an acrylamide structure were mixed and stirred to prepare a mixture. At the same time, water required for dilution was added to the compounds (C) and (D), and they were mixed and stirred to prepare a mixture. If there were multiple types of C, the order of addition was not specified. Finally, the mixtures were mixed together to prepare a solution. The composition of the obtained adhesive composition was as listed in Table 3. The mixing and stirring were all performed at room temperature (atmosphere temperature: about 27° C.), and the solution was used within a time range of immediately after preparation to about one day.

Next, a nylon cord for tires (made of nylon 66 (66Ny), cord structure: 1400 dtex/2, number of twists: 39×39/10 cm) was immersed in the adhesive composition of each sample for one minute and pulled up, so that the adhesive composition was coated on the cord. Next, the cord coated with the adhesive composition was dried at 150° C. for two minutes, and then the cord coated with the adhesive composition was applied with a tension (cord tension) of 1.5 kg/cord to 3.5 kg/cord using a heat treatment machine, and heat treatment was performed at 235° C. for 1.3 minutes.

Further, samples 2-16 to 2-19 of adhesive composition (aqueous solution containing each component in a predetermined solid content) having the composition listed in Table 3 were adhesive compositions for organic fiber cords which were a two-bath treatment solution, where a first-bath treatment solution and a second-bath treatment solution were prepared under the following conditions.

(First-Bath Treatment Solution)

The first-bath treatment solution of the example was a solution diluted with water so that "DENACOL EX614B" (manufactured by Nagase ChemteX Corporation) was 1% by mass, "ELASTRON BN77" (manufactured by DKS Co. Ltd.) as an isocyanate compound was 3% by mass, and "ISOBAM" (manufactured by Kuraray Co., Ltd.) was 6% by mass. The value of each "% by mass" was a ratio by mass when each component was blended as a liquid or solid in the liquid of the first-bath treatment solution. The ratios in a dry state were 38% by mass for "DENACOL EX614B", 35% by mass for "ELASTRON BN77", and 27% by mass for "ISOBAM".

(Second-Bath Treatment Solution)

The (A) rubber latex and the (β) compound having an acrylamide structure were mixed and stirred to prepare a mixture. At the same time, water required for dilution was added to the compounds (C) and (D), and they were mixed and stirred to prepare a mixture. If there were multiple types of C, the order of addition was not specified. Finally, the mixtures were mixed together to prepare a second-bath treatment solution. The composition of the obtained adhesive composition was as listed in Table 3. The mixing and stirring were all performed at room temperature (atmosphere temperature: about 27° C.), and the solution was used within a time range of immediately after preparation to about one day. The composition of the second-bath treatment solution with the total mass being 100 was as listed in Table 3. (The value of each "% by mass" was a ratio by mass when each component was blended as a liquid or solid in the liquid of the second-bath treatment solution.)

(Adhesion Treatment of Organic Fiber Cord (PET Cord for Tires) with First-Bath Treatment Solution)

After stirring the solution so that the components in each of the first-bath treatment solutions were uniformly dispersed, an organic fiber cord (PET cord for tires) with a cord fineness of 1670 dtex/2, a number of first twists of 39 twists/10 cm, and a number of second twists of 39 twists/10 cm was immersed in each of the first-bath treatment solutions, then the solvent in the first-bath treatment solution adhering to the PET cord for tires was dried, and adhesion treatment was performed by heating to obtain a PET cord for tires that had been subjected to adhesion treatment with the first-bath treatment solution. The drying treatment conditions were a drying temperature of 160° C. and a drying time of 80 seconds, and the adhesion treatment conditions by heating were a hot temperature of 205° C. and a hot time of 60 seconds.

(Adhesion Treatment of Organic Fiber Cord (PET Cord for Tires) with Second-Bath Treatment Solution)

The cord for tires that had been subjected to adhesion treatment with each of the first-bath treatment solutions was immersed in each of the second-bath treatment solutions, then the solvent in the second-bath treatment solution adhering to the cord for tires was dried, and adhesion treatment was performed by heating to obtain a cord for tires. The drying treatment conditions were a drying temperature of 160° C. and a drying time of 80 seconds, and the adhesion treatment conditions by heating were a hot temperature of 245° C. and a hot time of 60 seconds.

(2) Adhesion Test

The cord that had been treated with the adhesive composition of each sample as described above was embedded in an unvulcanized rubber composition containing natural rubber, a rubber component of a styrene-butadiene copolymer, carbon black, and a cross-linking agent to prepare a rubber-organic fiber cord composite, and the rubber-organic fiber cord composite was further vulcanized at 160° C. for 20 minutes under a pressure of 20 kgf/$cm^2$ to prepared a sample of rubber-organic fiber cord composite.

From each of the prepared samples of rubber-organic fiber cord composite, the organic fiber cord was dug up and pulled at a speed of 300 mm/min to separate the cord from each sample of rubber-organic fiber cord composite, and the peel resistance per cord was obtained and taken as the adhesiveness (N/cord). The obtained adhesiveness is listed in Table 3.

(3) Adhesion State of Coated Rubber

For the organic fiber cord that had been separated from the rubber-organic fiber cord composite, the adhesion state of the coated rubber was visually observed and scored according to the following criteria. The results are listed in Table 3.

A: Rubber adhesion rate: 80% or more
B: Rubber adhesion rate: 60% or more and less than 80%
C: Rubber adhesion rate: 40% or more and less than 60%
D: Rubber adhesion rate: 20% or more and less than 40%
E: Rubber adhesion rate: less than 20% excellent adhesion and mechanical stability even when it contains no formalin or resorcin.

Further, according to the present disclosure, it is possible to provide a rubber-organic fiber cord composite and a tire which reduce the load on the environment and have excellent adhesion between the rubber and the organic fiber cord and excellent productivity.

The invention claimed is:

1. An adhesive composition for adhering organic fiber cords, comprising
(A) rubber latex,
(B) a compound having an acrylamide structure,
(C) an aqueous compound having a thermal dissociative blocked isocyanate group, and
wherein the adhesive composition contains no formalin or resorcin.

TABLE 3

| Sample | | 2-1 Comparative Example | 2-2 Comparative Example | 2-3 Reference Example | 2-4 Example | 2-5 Example | 2-6 Example | 2-7 Example |
|---|---|---|---|---|---|---|---|---|
| (A) Rubber latex | Ingredient | A-1 | A-1 | A-1 | A-1 | A-1 | A-1 | A-1 |
| | Part by mass (dry) | 97.0 | 97.0 | 70.0 | 70.0 | 70.0 | 70.0 | 70.0 |
| (B) Compound having | Ingredient | B-2 | B-4 | B-2 | B-2 | B-2 | B-2 | B-2 |
| an acrylamide structure | Part by mass (dry) | 3.0 | 3.0 | 2.1 | 2.1 | 2.1 | 2.1 | 2.1 |
| (D) Epoxy | Ingredient | — | — | D-2 | — | — | — | — |
| compound | Part by mass (dry) | — | — | 27.9 | — | — | — | — |
| Polyphenol | Ingredient | — | — | — | — | — | — | — |
| compound | Part by mass (dry) | — | — | — | — | — | — | — |
| (C) Aqueous compound having | Ingredient (1) | — | — | — | C-1-1 | C-1-2 | C-2-1 | C-2-2 |
| a (thermal dissociative | Part by mass (dry) | — | — | — | 27.9 | 27.9 | 27.9 | 27.9 |
| blocked) | Ingredient (2) | — | — | — | — | — | — | — |
| isocyanate group | Part by mass (dry) | — | — | — | — | — | — | — |
| Treatment | | One-bath | One-bath | One-bath | One-bath | One-bath | One-bath | One-bath |
| Solid content of test adhesive liquid | | 18% | 18% | 18% | 18% | 18% | 18% | 18% |
| Fiber type | | 66Ny | 66Ny | 66Ny | 66Ny | 66Ny | 66Ny | 66Ny |
| Adhesiveness (N/cord) | | 6.0 | 4.0 | 18.7 | 22.7 | 19.3 | 16.8 | 13.0 |
| Adhesion state of coated rubber | | D | E | A | A | A | A | C |

| Sample | | 2-8 Example | 2-9 Reference Example | 2-10 Reference Example | 2-16 Reference Example | 2-17 Example | 2-18 Example | 2-19 Example |
|---|---|---|---|---|---|---|---|---|
| (A) Rubber latex | Ingredient | A-1 | A-1 | A-1 | A-1 | A-1 | A-1 | A-1 |
| | Part by mass (dry) | 70.0 | 67.9 | 53.4 | 80.0 | 67.9 | 67.9 | 61.5 |
| (B) Compound having | Ingredient | B-2 | B-2 | B-2 | B-2 | B-2 | B-4 | B-2 |
| an acrylamide structure | Part by mass (dry) | 2.1 | 2.1 | 1.7 | 10.0 | 2.1 | 2.1 | 7.7 |
| (D) Epoxy | Ingredient | — | D-2 | D-2 | — | — | — | D-1 |
| compound | Part by mass (dry) | — | 15 | 30 | — | — | — | 7.7 |
| Polyphenol | Ingredient | — | — | — | 2-2 | — | — | — |
| compound | Part by mass (dry) | — | — | — | 10.0 | — | — | — |
| (C) Aqueous compound having | Ingredient (1) | C-2-3 | C-2-5 | C-2-5 | — | C-2-4 | C-2-4 | C-2-4 |
| a (thermal dissociative | Part by mass (dry) | 27.9 | 15.0 | 15.0 | — | 30.0 | 30.0 | 23.1 |
| blocked) | Ingredient (2) | — | — | — | — | — | — | — |
| isocyanate group | Part by mass (dry) | — | — | — | — | — | — | — |
| Treatment | | One-bath | One-bath | One-bath | Two-bath | Two-bath | Two-bath | Two-bath |
| Solid content of test adhesive liquid | | 18% | 18% | 18% | 18% | 18% | 18% | 18% |
| Fiber type | | 66Ny | 66Ny | 66Ny | PET | PET | PET | PET |
| Adhesiveness (N/cord) | | 21.0 | 24.4 | 25.8 | 20.0 | 21.3 | 24.0 | 18.0 |
| Adhesion state of coated rubber | | A | A | A | B | A | A | C |

The results of Table 3 indicate that the adhesiveness was good when using the samples of adhesive composition of Examples.

INDUSTRIAL APPLICABILITY

According to the present disclosure, it is possible to provide an adhesive composition capable of achieving 2. The adhesive composition for organic fiber cords according to claim 1, further comprising (D) an epoxy compound.

3. The adhesive composition for organic fiber cords according to claim 2, wherein the (D) epoxy compound has two or more epoxy groups in one molecule.

4. The adhesive composition for organic fiber cords according to claim 2, wherein the (C) compound having the thermal dissociative blocked isocyanate group is a water-dispersible thermal dissociative blocked isocyanate compound that is an addition product of polyisocyanate having an aromatic ring and a blocking agent having at least one active hydrogen group.

5. The adhesive composition for organic fiber cords according to claim 1, wherein the (C) compound having the thermal dissociative blocked isocyanate group is an aqueous urethane compound having the thermal dissociative blocked isocyanate group.

6. The adhesive composition for organic fiber cords according to claim 5, wherein the aqueous urethane compound having the thermal dissociative blocked isocyanate group is a reaction product obtained by mixing (α), (β), (γ) and (δ) and reacting them, where (α) is an organic polyisocyanate compound having 3 or more and 5 or less functional groups and having a number average molecular weight of 2,000 or less, (β) is a compound having 2 or more and 4 or less active hydrogen groups and a number average molecular weight of 5,000 or less, (γ) is a thermal dissociative blocking agent, and (δ) is a compound having at least one active hydrogen group and at least one anionic, cationic, or nonionic hydrophilic group, and (α), (β), (γ) and (δ) are mixed so that the mixing ratio of (α) is 40% by mass or more and 85% by mass or less, the mixing ratio of (β) is 5% by mass or more and 35% by mass or less, the mixing ratio of (γ) is 5% by mass or more and 35% by mass or less, and the mixing ratio of (δ) is 5% by mass or more and 35% by mass or less with respect to the total amount of (α), (β), (γ) and (δ), and when a molecular weight of an isocyanate group (—NCO) is 42, a composition ratio of the thermal dissociative blocked isocyanate group in the reaction product is 0.5% by mass or more and 11% by mass or less.

7. The adhesive composition for organic fiber cords according to claim 5, wherein the aqueous urethane compound having the thermal dissociative blocked isocyanate group is represented by the following general formula (1),

[Chem. 1]

(1)

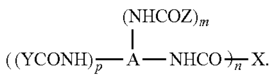

where

A is a residue of an organic polyisocyanate compound from which an active hydrogen group has been eliminated, X is a residue of a polyol compound having 2 or more and 4 or less hydroxyl groups and having a number average molecular weight of 5,000 or less from which an active hydrogen group has been eliminated, Y is a residue of a thermal dissociative blocking agent from which an active hydrogen group has been eliminated, Z is a residue of a compound having at least one active hydrogen group, and at least one salt-forming group or hydrophilic polyether chain, from which an active hydrogen group has been eliminated, n is an integer of 2 or more and 4 or less, and p+m is an integer of 2 or more and 4 or less, where m≥0.25.

8. The adhesive composition for organic fiber cords according to claim 1, wherein the (A) rubber latex is at least one selected from the group consisting of natural rubber (NR), polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR), and vinylpyridine-styrene-butadiene copolymer rubber (Vp).

9. The adhesive composition for organic fiber cords according to claim 1, wherein a molecular weight of the (β) compound having an acrylamide structure is 10,000 to 7,000,000.

10. The adhesive composition for organic fiber cords according to claim 2, wherein a total content of the (A) rubber latex and the (β) compound having an acrylamide structure is, in terms of solid content, 20% to 95%, with a total content of the (A) rubber latex, the (β) compound having an acrylamide structure, the (D) epoxy compound, and the (C) aqueous compound having the thermal dissociative blocked isocyanate group being 100%, and a content of the (B) compound having an acrylamide structure is, in terms of solid content, 0.3% to 30%, with a total content of the (A) rubber latex and the (β) compound having an acrylamide structure being 100%.

11. A rubber-organic fiber cord composite comprising a rubber member and an organic fiber cord, wherein at least part of the organic fiber cord is coated with the adhesive composition according to claim 1.

12. A tire using the rubber-organic fiber cord composite according to claim 11.

13. The adhesive composition for organic fiber cords according to claim 2, wherein the (A) rubber latex is at least one selected from the group consisting of natural rubber (NR), polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR), and vinylpyridine-styrene-butadiene copolymer rubber (Vp).

14. The adhesive composition for organic fiber cords according to claim 2, wherein a molecular weight of the (β) compound having an acrylamide structure is 10,000 to 7,000,000.

15. The adhesive composition for organic fiber cords according to claim 3, wherein the (A) rubber latex is at least one selected from the group consisting of natural rubber (NR), polyisoprene rubber (IR), styrene-butadiene copolymer rubber (SBR), polybutadiene rubber (BR), ethylene-propylene-diene rubber (EPDM), chloroprene rubber (CR), halogenated butyl rubber, acrylonitrile-butadiene rubber (NBR), and vinylpyridine-styrene-butadiene copolymer rubber (Vp).

16. The adhesive composition for organic fiber cords according to claim 3, wherein a molecular weight of the (β) compound having an acrylamide structure is 10,000 to 7,000,000.

17. The adhesive composition for organic fiber cords according to claim 3, wherein a total content of the (A) rubber latex and the (β) compound having an acrylamide structure is, in terms of solid content, 20% to 95%, with a total content of the (A) rubber latex, the (β) compound having an acrylamide structure, the (D) epoxy compound, and the (C) aqueous compound having the thermal dissociative blocked isocyanate group being 100%, and a content of the (B) compound having an acrylamide structure is, in terms of solid content, 0.3% to 30%, with a total content of the (A) rubber latex and the (β) compound having an acrylamide structure being 100%.

* * * * *